Dec. 14, 1954
G. W. GREBER
2,696,705
POWER-DRIVEN LAWN MOWER
Filed April 14, 1952
2 Sheets-Sheet 1
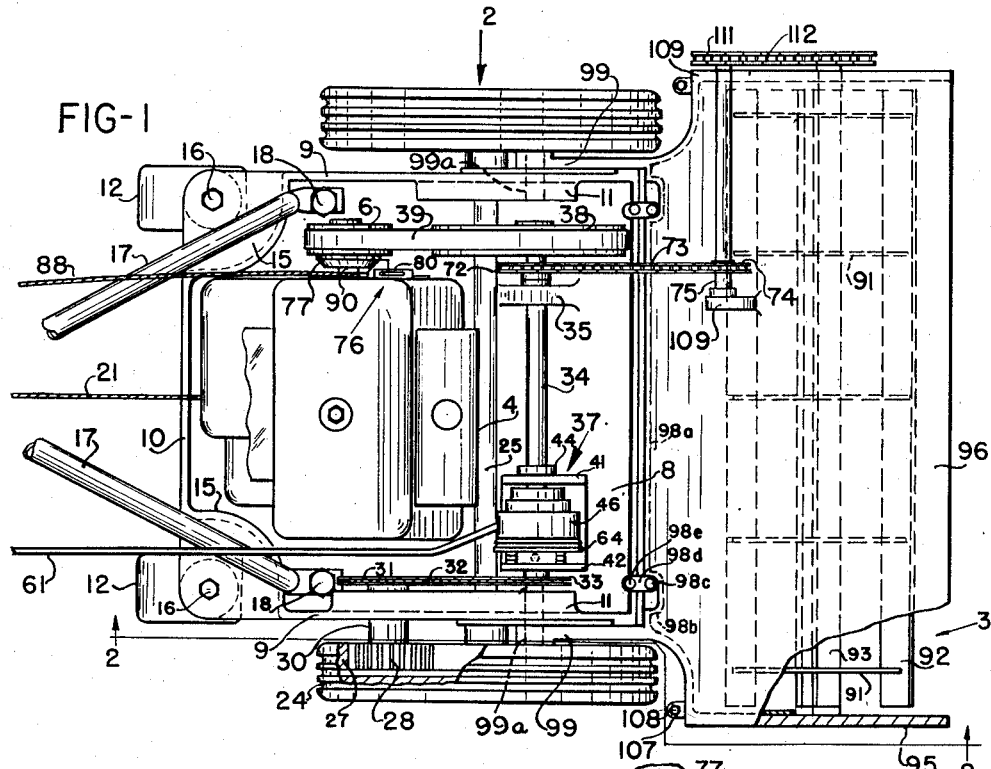
FIG-1
FIG-3
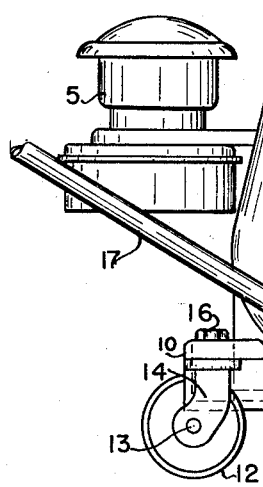
FIG-2
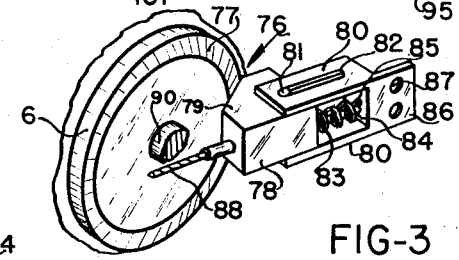
INVENTOR
GEORGE W. GREBER
BY Toulmin & Toulmin
ATTORNEYS Dec. 14, 1954 G. W. GREBER 2,696,705
POWER-DRIVEN LAWN MOWER
Filed April 14, 1952 2 Sheets-Sheet 2
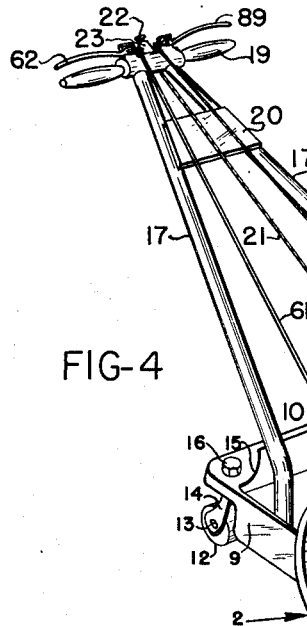
INVENTOR
GEORGE W. GREBER
BY Toulmin & Toulmin
ATTORNEYS

United States Patent Office 2,696,705
Patented Dec. 14, 1954

2,696,705

POWER-DRIVEN LAWN MOWER

George W. Greber, New Bremen, Ohio

Application April 14, 1952, Serial No. 282,129

13 Claims. (Cl. 56—26)

The present invention relates to power mowers, and more particularly to mowers of the type that are hand guided.

Mowers of the power driven type have a number of disadvantages. Due to the heavy weight of the engine and the position of the drive wheels with respect to the cutting reel, the wheels tend to break down the grass before it reaches the reel.

Another disadvantage is the fact that the engine is so positioned with respect to the mechanism as a whole as to cause excessive vibration, with consequent unevenness of cut and loosening of parts. Power mowers are also difficult to maneuver, mainly on account of the fact that the mower cannot be backed up except by tilting it on the rear roller or rollers. In this case all the mechanism including the reel continues to operate.

The difficulty of maneuverability is also present when it is desired to cut close to a tree or flower bed because the operator cannot exercise the necessary freedom of control of the various power driven elements.

Moreover, practically all of the commercial power mowers on the market do not lend themselves to inexpensive maintenance in that it is difficult to take them apart or make the necessary adjustments as, for example, when the cutting reel has to be sharpened or the depth of cut need be adjusted.

The primary object of the invention is to provide a power mower which will not have the disadvantages aforementioned.

Another object is to provide a power mower in which the parts may be readily removed for replacement or repair.

Still another object is to provide a power mower in which the traction wheels may be completely disengaged from both the engine or motor and from the cutting reel to permit the mower to be readily rolled over the ground from place to place.

A further object is to provide a power mower in which the traction wheels and the cutting reel are mechanically connected together but may be disconnected from the engine or motor in order that the mower can be pushed by hand and the reel would gain its rotary power from the traction wheels. This provision also permits the mower to be manually pulled in the rearward direction without disconnecting the cutting reel and the latter is ready to cut in the forward direction when the mower is pushed in that direction.

Still another object is to provide a power mower in which all the heavy parts, including the gas engine, are supported at a position not greatly above the grass line, so that the center of gravity of the parts as a whole will be relatively low and vibration is accordingly reduced.

A further object is to provide a power mower in which the distance between the traction wheels is less than the length of the cutting reel in order that the grass will be cut over a swath wider than the path taken by the traction wheels and thus leaving no track marks or grass broken down.

A still further object is to provide a power mower in which the cutting reel and the shield surrounding the mower may be bodily lifted or rotated into practically a vertical position in order to facilitate inspection and repair without necessitating the removal of any of the chain drives or gears.

A still further object is to provide a power mower which includes a hood positioned over the cutting reel and provision is made by which the depth of cut can be regulated exterior of the hood or shield.

Other objects and features will be apparent as the following specification is perused in connection with the accompanying drawings, in which:

Figure 1 represents a plan view of the improved power mower with the exception of the handle and control levers;

Figure 2 is an elevational view of the mower;

Figure 3 illustrates in perspective an enlarged view of a detail of a typical form of clutch which can be employed for connecting and disconnecting the cutter reel from the motor for the purpose hereinafter explained and in accordance with the principles of my invention;

Figure 4 represents a perspective view on a reduced scale of the entire mower;

Figure 5 is an exploded detail view of one of the bearings for the cutting reel;

Figure 6 illustrates an enlarged view, partly in section and partly in elevation, a suitable type of clutch for connecting and disconnecting the wheels from the motor;

Figure 7 is an enlarged detail view in perspective and broken away, showing one of the forward rollers and immediately associated structure; and Figure 8 is a perspective view of the clutch illustrated in Figure 6, but on a somewhat smaller scale.

Figure 9 is an enlarged fragmentary perspective view showing the levers mounted on the guide handle, also the cables attached to the levers and the gas control knob.

The improved mower consists essentially of three mechanical parts or mechanism:

1. The gas engine or motor, generally indicated by reference character 1.
2. The traction wheels, generally indicated at 2; and
3. The cutting reel, indicated at 3.

These parts or mechanisms are so associated in an improved manner that the engine can be disconnected from either the traction wheels or the cutting reel at the will of the operator, and usually controllable from the guide handle of the machine.

The traction wheels are located within the mowing length of the cutting reel so that the grass over which the wheels travel will already have been cut before being traveled over by the wheels.

The motor mechanism

The motor may comprise a conventional gas engine of any suitable type, including a gas tank 4 and a combined air filter and carburetor 5. The pulley of the gas engine is indicated at 6. The engine has a base 7 which is bolted down to a heavy metal carrier frame 8. This frame may have a rectangular configuration and, in addition to the solid bottom plate, comprises sides 9 and end members 10. The sides and ends extend upwardly the same distance except that a flat extension 11 of heavier thickness is provided over a portion of the sides to provide bearings for the various gear shafts, which will be described hereinafter.

The rear end of the frame 8 is carried on a pair of spaced rollers 12. These rollers are journaled at 13 in swivel lugs 14 which depend from inwardly projecting corner plates 15 formed of the same casting as the frame 8. Suitable securing means such as nuts 16 are provided to permit the castor wheels 12 to swing in the vertical direction.

The forward end of the frame 8 is supported on a pair of traction wheels which will be described presently.

The frame, the engine supported thereon and other associated mechanism are guided by means of a pair of heavy bars 17 which may be of tubular configuration, these bars being bolted or otherwise secured at 18 to the frame. The upper ends of the bars terminate in a crossbar 19 which serves as a guide handle. If desired, a reinforcing plate 20 can be welded or otherwise secured to the bars.

In order to control the speed of the engine, a cable 21 leading to the butterfly valve of the carburetor may be employed, this cable being provided at the handle bar position by a sliding knob 22 which is frictionally held within an upstanding member 23. Thus, by pulling out the knob 22, the gas control valve of the engine is opened and the engine speeds up. The knob or button 22 will retain any position to which it has last been moved in order to assure a constant desired speed of the engine.

Traction wheels

The traction wheels, generally indicated at 2, may comprise metal discs grooved at the periphery as indicated at 24, to receive one or more rubber treads.

These wheels are carried on a shaft 25, journaled in bushings 26, which are mounted in the thickened portions 11 of the side elements 9. One of the wheels, the left-hand wheel as shown in Fig. 4, is keyed to the shaft and the other is loose on the shaft.

The wheels 2 are provided with receding web portions (not shown), leaving a rim on the inside surfaces which face one another. The inner surface of the rim of the left-hand wheel is provided with teeth 27 which mesh with a pinion 28. This pinion is carried on a stub shaft 29 journaled in a bushing 30 and the latter is supported on the thickened portion 11 of the lower side member 9 (Fig. 1). At the end opposite from the pinion 28, the shaft 29 carries a gear 31.

A chain 32 passes around the gear 31 and meshes with the teeth of a sprocket gear 33 keyed to a drive or jack shaft 34. The latter is journaled in an upstanding lug 35 at one end and in a bushing member 36 at the other end, this bushing being supported on the heavy portion 11 of the side member. There is a clutch indicated generally at 37 interposed in the shaft 34, the details of which will be described in connection with Figs. 6 and 8.

The shaft at the end opposite from this clutch carries a pulley 38 which receives a belt 39 passing over the pulley 6 keyed to the engine shaft.

Thus, the lower traction wheel 2 (Fig. 1) is driven through the pinion 28, the chain 32, sprocket gear 33, shaft 34, pulley 38, belt 39 and pulley 6 by the engine 1. Since one of the traction wheels 2 is keyed to the shaft 25, this wheel will receive power from the engine. The other wheel 2 simply idles on the shaft, although if desired, this wheel may be keyed to the shaft.

The shaft 34 may be mechanically disconnected from the sprocket gear 33 by means of the clutch 37. A clutch of a suitable type has been illustrated in Figs. 6 and 8. The shaft 34 is made in separate parts, as indicated at 40, these parts passing through the upright legs 41, 42 of a yoke member indicated generally at 43. The base of this member is secured in any suitable manner to the bottom plate 8 of the frame.

The left-hand portion of the shaft 34 is held within the leg 41 of the yoke member by a collar 44 secured to the shaft at the set screw 45, and within this yoke leg, the shaft 34 carries a cup-shaped clutch member 46. This member is provided with a hub 47 through which a set screw 48 is taken to the shaft. The interior surface of the member 46 is tapered as indicated at 49 and there is a conically shaped lining 50 secured to this tapered surface, the lining being of any friction, hard wearing material such as leather. It is apparent that the cup-shaped member 46 will rotate whenever the pulley 38 is rotated.

The right-hand end of the shaft 34, as seen in Fig. 6, is held longitudinally in place by means of the sprocket gear 33 and a collar 51 is secured to the shaft by a set screw 52. A circular plate 53 is loose on the shaft.

Surrounding the lower half of the plate 53 there is a Y-shaped yoke member indicated generally at 54, this yoke member having a pair of spaced prongs 55 at each side and a centrally positioned downwardly extending lug 56. A bell crank lever 57 is pivotally supported on a pin 58, the latter being secured to the bottom of the U-shaped member 43. The lug 56 is provided with a downwardly extending pin 59 having a shouldered portion (not shown), of smaller diameter which is swivelly received by an opening in one of the legs of the lever 57. The other leg of the lever is provided with an aperture 60 to which is connected in any suitable manner a cable 61.

This cable extends upwardly as far as the handle bars 19 and the latter is provided with a hand operated pivoted lever 62 having a hook portion at the inner end for pulling upon the cable 61 or releasing the cable, depending on whether the lever is moved away from or toward the handle 19. Thus when the cable 61 is pulled, as by compressing the lever against the handle bar, the plate member 53 is caused to move to the left along the shaft 34, as shown in Fig. 8.

Directly to the left of the plate 53 there is a conically-shaped member 64 keyed as indicated at 65 to rotate with the shaft 34 but adapted to slide along the shaft. This member 64 is provided with an undercut at the outer edge on the flat side so as to receive an annular ring 63. The downwardly extending lug 56 has an opening 66 for tightly receiving a rod 68. This rod is loosely fitted in an opening 69 in the leg 41 of the yoke member 43. The compression spring 70 surrounds the rod and bears against the inner surfaces of the yoke 41 and the lug 56. There is a pair of small projections or pins 67 extending radially from the plate 53 at approximately the horizontal diametral positions, these projections being received within the spaces between each set of prongs 55.

It is apparent that as the cable 61 is pulled upwardly by compressing the lever 62 against the handle 19, the bell crank lever 57 will rotate in a counter-clockwise direction, as seen in Fig. 8, to cause the plate member 53 to move inwardly against the action of the compression spring 70 and to force the cone member 64 against the leather lined clutch member 46.

Inasmuch as the left-hand portion of the shaft 34, as seen in Fig. 6, rotates whenever the pulley 38 is rotated, any rotational movement of the clutch member 46 is communicated to the disengageable clutch member 64 to cause rotation of the right-hand portion of the shaft 34 and thereby rotate the sprocket gear 33. As explained hereinbefore, this sprocket gear communicates mechanical motion to the traction wheels 2 through the chain 32.

When the lever 62 is released and the cable rendered loose, the spring 70 causes the plate 53 to return to its original position so that the clutch member 64 can, of its own accord, become disengaged from the rotating member 46.

The left-hand portion of the shaft 34, as seen in Fig. 6, is also provided with a sprocket gear 72 exterior to the lug 35 and a chain 73 is taken from this sprocket gear to a sprocket wheel 74 positioned on a shaft 75. The shaft 75, as shown in Fig. 2, is for the purpose of operating the cutting reel of the machine, as will be described hereinafter.

In operation, and in accordance with one of the features of my invention, not only can the traction wheels 2 be disconnected from the gas engine at the clutch 37, but the cutting reel can also be disconnected from the gas engine at a second clutch indicated generally at 76 (Fig. 3).

This second clutch also obviously controls the shaft 34 so that the traction wheels 2 are subject to the operation of both clutches 37 and 76, whereas the operation of the cutting reel is subject only to the single clutch 76. The latter clutch, as seen more clearly in Fig. 3, is positioned at the engine pulley 6. The latter is of a split pulley design, the parting line extending diametrally through the pulley midway of its thickness. One-half of the pulley is affixed to the engine shaft and the other pulley half is merely keyed to the shaft but is adapted to slide over a limited distance along the shaft, for purposes as will be explained hereinafter.

It is obvious that by causing the movable half of the pulley to shift away from the fixed half, the belt 39, assuming that it is of a wedge shape, can be caused to slip on the separated halves of the pulley when the clutch is out. But when the clutch is in, as when it is desired to drive the pulley 38, a mechanism is provided for causing the shiftable portion of the pulley to move toward the fixed portion and to allow the belt firmly to grip the groove formed by these two pulley portions. Any suitable hand-operated mechanism can be employed for this purpose and Fig. 3 illustrates a typical design and construction.

As shown in this figure, the movable pulley portion is provided at its outside edge with a tapered surface indicated at 77. A cam block 78 is designed to bear against this surface when the clutch is in and thereby to press the slidable pulley portion against the fixed pulley portion, as explained hereinbefore. The cam block has a tapered surface as indicated at 79 and the block is slidably contained within a pair of spaced plates 80. Pins 81 are driven into the top and bottom surfaces of the block 78, and slots 82 are provided in each of the plates 80 for loosely receiving the pins.

There is a tension spring 83 supported on a rod 84 contained in the space between the inner end of the block 78 and an abutment 85 which forms a connecting piece between the plates 80. A rectangular extension 86 is provided integral with the plates 80 and has two holes 87 for securing the mechanism to the engine casting.

A cord 88 is fastened to the smaller end of the block 78, the cord passing upwardly to one end of a lever 89, and is suitably affixed to the guide bar 19. The arrangement is such that when the lever 89 is depressed, a pull-up on the cable 88 is effected which pulls the block 78 slidably between the plates 80 and guided by the pins 81 within the slots 82.

The tapered edge 79 of the block applies a lateral pressure against the movable portion of the pulley and causes it to slide along the engine shaft indicated at 90, to such a position that the belt 39 can find a solid grip along the tapered sides of the pulley. Thus, the belt will be firmly driven by the pulley to rotate the main shaft pulley 38.

The spring 83 is pulley out in tension by this sliding action of the block and upon release of the lever 89 the block is caused to recede into its compartment between the plates 80 by the action of the spring and the tapered surface of the belt 39 will cause the two halves of the pulley 6 to spread and the rotation at the pulley 38 is stopped.

From the foregoing, it is evident that the lever 89 in its uncompressed or upper position permits the spring 83 to maintain the block 78 in its retracted position, and the pulley half 6 is removed from the other pulley half. The clutch is therefore out and the belt 39 merely slips around the pulley halves without finding a grip. However, when the lever 89 is squeezed against the guide bar 19, as when it is desired to power-operate the mower, a pull is exercised on the block 78 against the spring 83 to cause the cam surface 79 to move its pulley half against the other half and power is transmitted by the belt 39. The reel 3 is thereupon rotated through the shaft 34, chain 73, shaft 75 and chain 112. However, the traction wheels will not be rotated because the mechanical connection thereto has been broken at the clutch 37, assuming that the lever 62 has not, at that moment, been depressed.

*Cutting reel*

The cutting reel comprises the usual five-pointed support discs 91, of which five may be employed for the ordinary length of cutter, equidistantly spaced, and having five flat surfaces to which the cutter bars 92 may be screwed or otherwise secured. These discs or plates are mounted on a shaft 93, as seen more clearly in Fig. 4, and the ends of the shafts are journaled as indicated at 94 in the end portions 95 of a hood or shield 96. The bearings are shown more in detail in Fig. 5.

The end portions 95 of the shield 96 are provided with semi-circular cut-outs which are adapted to receive the cutting reel shaft 93 and this shaft is rotatably held in this position by a bracket 97. The bracket is secured to the end member 95 by a pair of screws 98. Thus, in order to remove the cutting reel, it is simply necessary to take out the screws 98 and the bracket 97. The hood 96 is formed with a wall 98a at the rear of the cutting reel and then extends over the top considerably forward of the cutting reel so as to prevent grass from being swept back over the gear mechanism.

A ledge 98B is provided in the vertical wall to receive a pair of spaced cap screws 98c. Dogs 98d are swivelly supported on these screws. The dogs have threaded openings to receive cap screws 98e which bear against the upper edge of the inner end wall 10 of the frame 8. The purpose of the cap screws 98e is to adjust the height of the hood 96 and the cutting reel with respect to the frame 8 by causing the hood to pivot about the axis of the shaft 34. Thus the weight of the hood is supported in part by the frame and the height of the cutting reel above the grass can be regulated.

The hood is pivotally held in position at each end by ribs 99 formed integral with the hood and terminating in a pair of sleeves which form the bushing members 36. These bushings surround fixed bearing pins 99a which are in axial alignment with the shaft 34 and are supported by the extensions 11. Thus the hood 96 is pivotally mounted in axial alignment with the shaft 34 and can therefore ride up or down in the vertical direction, depending on the contour of the ground being mowed.

The hood is provided at the lower end with a pair of rollers 100 made of wood or metal and these rollers are journaled at one end in an extension 101 depending from the end of the hood and at the other end in a metal partition member 102, welded or otherwise secured to the rear portion of the hood. These rollers take only a portion of the weight of the hood and contained cutting reel, thereby permitting the reel closely to follow the contour of the ground.

There is a shearing plate 103 extending the full length of the cutting reel, this plate being provided with end pieces 104 which are pivotally mounted on an extension of the shaft 105 which carries the rollers 100. The plate is given a downwardly curved shape and extends to a position closely adjacent the cutter bars 92 as they come around, as can be seen in Fig. 2.

The rear end of the plate 103 is provided with a lug 106 about midway of its length and this lug extends through a vertical slot in the hood. The latter carries a pair of stationary lugs 107 above and below the lug 106, and set screws 108 pass through these stationary lugs to bear against the lug 106. Thus, by tightening one of the set screws and loosening the other, the lug 106 can be moved upwardly or downwardly, thus causing the plate 103 to pivot about the shaft 105 on which it is mounted, and the distance between this plate and the cutting knives can be closely adjusted.

There is a pair of brackets 109 integrally or otherwise secured to the hood 96, these brackets serving as bearings for the shaft 75. As explained hereinbefore, this shaft carries at one end a sprocket wheel 110 over which a chain 73 passes to the sprocket wheel or gear 72. The other end of the shaft 75 is provided with a sprocket gear 111 for receiving a chain 112. The latter engages a sprocket wheel or gear 113 (Fig. 2) which is carried on the cutting reel shaft 93. It is therefore apparent that when the pulley 38 is rotated, the sprocket gear 72 causes rotation of the gear 74 which, in turn, rotates the gear 111 to operate the cutting reel 91.

The hood 96 and the contained cutting reel are, in effect, pivotally mounted on the shaft 34 on account of the integral ribs 99 so that these members automatically raise when bumps or other irregularities appear on the ground being mowed. It will be further apparent that when desired, the hood and the cutting reel can readily be moved to practically a vertical position about the shaft 34 in order to inspect the cutting reel or to remove the reel, as by unscrewing the brackets 97.

Since the brackets 109 which carry the shaft 75 are integral with the hood, the distance between the centers of the shafts 34, 75 and 93 always remain the same, so that regardless of the position of the hood 96 and the cutting reel, the chains 73 and 112 will remain taut. It is often necessary in the case of prior art types of power mowers to remove the drive chains in order to expose and render more accessible the cutting reel. But it will be noted in the present case that the upward swing of the hood 96 to a practically vertical position will render the cutting reel completely accessible without making any changes in the chain connections.

*General operation of the power mower*

From the foregoing it is evident that I have disclosed a power mower which has three sets of controls:

(1) The usual butterfly valve or carburetor control at the engine;

(2) The control indicated at the lever 89 for disengaging both the traction wheels and also the cutting reel from the gas engine; and (3) The control indicated by the lever 62 which disconnects the traction wheels from the shaft 34 and therefore from each of the gas engine and the cutting reel.

Thus, when the lever 62 is squeezed against the handle bar but the lever 89 is left in an uncompressed state, the power-driven traction wheel and the cutting reel are mechanically connected together through the clutch 37 and the chains 73, 112, but disconnected from the engine. When the mower is pushed under these conditions, it operates just like an ordinary hand mower and this facility of operation may be handy when mowing in close quarters, as near trees, plants and flower beds.

On the other hand, when the levers 62 and 89 are left in an uncompressed or unsqueezed condition, the power-driven traction wheel and the cutting reel are disconnected from one another and also disconnected from the engine. Thus the wheels may be readily rotated by simply pushing the mower, and this is of advantage in transporting the mower between widely separated places on the lawn without having to run the cutting reel.

Finally, when the lever 89 is squeezed and the opposite lever 62 is left in an uncompressed condition, the power-driven wheel is disconnected from both the gas engine and from the cutting reel, but the reel is connected to the engine. Thus the traction wheels are free to move in any direction at the will of the operator by simply pushing or pulling the mower, and the reel will be in a position to cut the grass in otherwise inaccessible or hard-to-reach places. This is an important feature of my invention.

The various combinations of the operations of the traction wheels and cutting reel with respect to one another and with respect to the gas engine are numerous, thus lending to the machine as a whole the maximum facility of operation, precise mowing, and above all, giving the same advantages, or even more, than one normally finds only in hand mowers.

The power mower can be readily backed up by simply disconnecting the clutch 37 at the lever 62.

It will be further noted in Fig. 1 that the traction wheels 2 are spaced apart a distance which is less than the length of the cutting reel 91. By bringing these traction wheels considerably within the lateral boundary of the cutting reel, the swath of the grass that is cut is wider than the outermost distance of the traction wheels so that the latter passes over grass already cut rather than passing over grass that is still to be cut and which is usually broken down by the weight of the mower.

The engine 1 is bolted directly to the frame plate 8 and the latter is positioned only a few inches above the ground, just above the grass line. Consequently, the center of gravity of the engine is considerably lower with respect to the mower frame than in the mowers of the prior art in which the engine is normally positioned over and therefore considerably above the traction wheels.

When the improved power mower is being driven over rough terrain, there is less likelihood of excessive vibration occurring throughout the machine as a result of the low, underslung position of the engine so that the mower will cut the grass with more evenness than in the case where the engine is positioned at a higher level.

It will be understood that various modifications and arrangements in structure could be made without departing from the spirit of my invention and, accordingly, I desire to comprehend such modifications and substitutions of equivalents as may be considered to come within the scope of the appended claims.

Having thus fully set forth and described my invention what I claim as new and desire to secure by Letters Patent is:

1. A power mower having a power device, a set of traction wheels and a cutting reel, a frame for said wheels and power device, said frame including a base plate positioned close to the brass line, said power device secured directly to said base plate, a shaft mounted above said base plate carrying said traction wheels, a power driven jack shaft positioned between said traction wheel shaft and the cutting reel, said jack shaft being supported on said frame, a hood for said cutting reel, a second jack shaft mounted on said hood, sprocket wheels on each of said jack shafts in line with one another for carrying a power chain, said second mentioned jack shaft having a sprocket wheel at one end, a gear at the other end and opposite said reel, and a chain between said last mentioned sprocket wheel and said gear whereby power is transmitted from the first mentioned jack shaft to the cutting reel.

2. A power mower having a source of mechanical power, a pair of traction wheels mounted on a shaft and a multi-bladed cutting reel, the reel being positioned forward of said wheels and a shield surrounding said reel and supporting the reel, a cutting knife associated with the blades of said reel, means for adjusting the distance between said knife and the blades of said reel as they rotate, said means being located exterior of said shield, a power shaft interposed between the wheel shaft and the cutting reel, a clutch positioned structurally and functionally between said last mentioned shaft and said source of mechanical power, said shield being pivotally mounted on said last mentioned shaft.

3. A power mower having a motor mechanism, power driven traction wheels and a power driven cutting reel, a jack shaft for transmitting power from said motor mechanism to said wheels and reel, means including a plurality of clutches controlled by the operator for simultaneously disconnecting the wheels and the cutting reel from the motor mechanism, one of the clutches being mechanically interposed between the traction wheels and the cutting reel in order to permit freewheeling of the traction wheels and another of said clutches being positioned both structurally and functionally between said motor mechanism and said jack shaft.

4. A power mower having a motor mechanism, a pair of traction wheels at least one of which is power driven, a power driven cutting reel, means for mechanically connecting and disconnecting the traction wheel and cutting reel to and from the motor mechanism, and means for maintaining the connection between the cutting reel and said mechanism when the traction wheel is disconnected from said mechanism, said first mentioned means comprising a power driven jack shaft physically interposed between the motor mechanism and the cutting reel and a clutch controllable by the operator positioned between said jack shaft and said power driven traction wheel, said second mentioned means comprising a clutch controllable by the operator and physically and functionally interposed between the motor mechanism and said jack shaft.

5. A power mower having a gas engine, a pair of traction wheels at least one of which is power driven, a cutting reel, a frame for carrying said gas engine and said traction wheels, said frame including a base plate to which the gas engine is directly bolted, a jack shaft supported above said frame, a pulley on said engine and a pulley on said jack shaft which receives a belt passing around the engine pulley, a clutch interposed between said pulleys so as to mechanically connect and disconnect the jack shaft from said gas engine, said jack shaft carrying a pair of spaced sprocket gears, one of said gears serving to transmit power to at least one of said traction wheels, a manually operated clutch positioned between said jack shaft and the traction wheels to control the transmission of power to said wheels, the other of said sprocket gears on said jack shaft mechanically connected to gearing to power drive said cutting reel.

6. A power mower having a source of mechanical power, a pair of traction wheels mounted on a shaft and a multi-bladed cutting reel, the reel being positioned forward of said wheels, and a shield surrounding said reel and supporting the reel, a cutting knife associated with the blades of said reel, means for adjusting the distance between said knife and the blades of the reel as they rotate, said means including a lug extending from the cutting knife through a slot in the shield to a position exterior thereof, and a lug integrally secured to the shield in juxtaposition to the cutting knife lug, and a set screw passing through one of said lugs to bear against the other lug in order to move the active end of the cutting knife with respect to the blades of the cutting reel.

7. A power mower having a source of mechanical power, a pair of traction wheels mounted on a shaft and a multi-bladed cutting reel, the reel being positioned forward of said wheels, and a shield surrounding said reel and supporting the reel, a cutting bar associated with the blades of said reel, support rollers journaled on shafts mounted on said shield, said bar being provided with plates that are pivotally mounted on said roller shafts, and an extension from said bar passing through an opening on said shield, and means for causing the bar and the pivoted plates to rotate about the roller shafts in order to control the distance between the cutting edge of the bar and the blades of the cutting reel.

8. A power mower having a power device, a set of traction wheels and a cutting reel, said traction wheels being positioned between said power device and said cutting reel, whereby the reel is presented to the grass ahead of the wheels, said traction wheels being carried on a power shaft, and a jack shaft positioned between the traction wheel shaft and the reel, a clutch positioned functionally and structurally between said power device and jack shaft, means for transmitting power from said power device to said jack shaft when said clutch is rendered operative by the operator, means for transmitting rotative power from said jack shaft to each of the traction wheel shaft and the cutting reel, a shield mounted over and along the sides of said cutting reel for preventing the grass from being thrown rearwardly against the mechanism and power device, said shield having a pair of extensions which are pivotally supported on the axis of said jack shaft whereby the shield and the contained cutting reel can be lifted at the pivot support in order to expose the cutting reel for purposes of adjustment and repair.

9. A power mower having a source of mechanical power, a set of traction wheels, a frame for said wheels and source of power, said wheels being mounted on a shaft, and a cutting reel, the reel being positioned forward of said wheels, and a shield surrounding said reel and supporting the reel, a jack shaft interposed between the wheel shaft and the cutting reel, a clutch interposed between said jack shaft and source of mechanical power, said clutch being adapted to be operated by an operator, said shield being pivotally mounted on the axis of said jack shaft, and means for adjustably moving the shield and contained reel about said axis in order to regulate the depth of the cut by the reel.

10. A power mower having a source of mechanical power, a set of traction wheels, a frame for said wheels and source of power, said wheels being mounted on a shaft, and a cutting reel, the reel being positioned forward of said wheels, and a shield surrounding said reel and supporting the reel, a power shaft interposed between the wheel shaft and the cutting reel, said shield being pivotally mounted on the axis of said power shaft, and means for adjusting the height of the shield and contained reel above the ground, said means including an adjustment screw on the shield bearing against said frame.

11. A power mower having a power device, a set of traction wheels and a cutting reel, a frame for said wheels and power device, said frame comprising a base plate having upstanding sides and end members, said traction wheels being journaled on opposite sides of said frame, a jack shaft mounted on said frame at a position between the traction wheels and the cutting reel, a hood positioned over said cutting reel and pivotally supported on said jack shaft, a pair of rollers secured to the opposite side members of said frame on the opposite side of said traction wheels from said reel, and a pair of rollers secured to the lower edge of said hood on the opposite side of said traction wheels from said first mentioned rollers.

12. A power mower having a power device, a set of traction wheels and a cutting reel, a frame for said wheels and power device, said frame comprising a base plate formed of side and end members, said traction wheels being journaled on opposite sides of the frame side members, a jack shaft positioned between the traction wheel and the cutting reel, said jack shaft being mounted on said frame surrounding said reel, bearing pins in said side members in line with the axis of the jack shaft, a hood over the top and rear portions of said reel, said hood being pivotally mounted on said pins in line with the jack shaft, and means including a screw device between the hood and frame for adjustably determining the position of the hood on its pins in order to control the position of the hood with respect to the ground.

13. A power mower having a power device, a set of traction wheels and a cutting reel, a frame for said wheels and power device, said frame comprising a base plate formed of side and end members, said traction wheels being journaled on opposite sides of the frame side members, a jack shaft positioned between the traction wheel and the cutting reel, said jack shaft being mounted on said frame surrounding said reel, bearing pins in said side members in line with the axis of the jack shaft, a hood over the top and rear portions of said reel, said hood being pivotally mounted on said pins in line with the jack shaft, means including a screw device between the hood and frame for adjustably determining the position of the hood on its pins in order to control the position of the hood with respect to the ground, and a pair of casters at the rear corners of said frame member and a pair of rollers secured to the lower edges of said hood at opposite sides of the power mower.

References Cited in the file of this patent

UNITED STATES PATENTS

| Number | Name | Date |
|---|---|---|
| 1,819,133 | Stegeman et al. | Aug. 18, 1931 |
| 1,886,408 | Locke et al. | Nov. 8, 1932 |
| 2,368,290 | Donald | Jan. 30, 1945 |
| 2,479,937 | Knowles | Aug. 23, 1949 |
| 2,505,879 | Blydenburgh | May 2, 1950 |
| 2,509,993 | Soss | May 30, 1950 |
| 2,519,019 | Blydenburgh | Aug. 15, 1950 |
| 2,604,747 | Bach | July 29, 1952 |